US009846907B2

(12) United States Patent
Granbery

(10) Patent No.: US 9,846,907 B2
(45) Date of Patent: *Dec. 19, 2017

(54) WIRELESS BEACON CONNECTIONS FOR PROVIDING DIGITAL LETTERS OF CREDIT ON DETECTION OF A USER AT A LOCATION

(71) Applicant: PayPal, Inc., San Jose, CA (US)

(72) Inventor: John Hastings Granbery, Los Altos, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/490,685

(22) Filed: Apr. 18, 2017

(65) Prior Publication Data

US 2017/0221143 A1  Aug. 3, 2017

Related U.S. Application Data

(63) Continuation of application No. 14/675,658, filed on Mar. 31, 2015, now Pat. No. 9,626,721.

(51) Int. Cl.
| G06K 19/00 | (2006.01) |
| G06Q 40/02 | (2012.01) |
| G06Q 20/10 | (2012.01) |
| G06Q 20/24 | (2012.01) |

(52) U.S. Cl.
CPC .......... *G06Q 40/025* (2013.01); *G06Q 20/10* (2013.01); *G06Q 20/24* (2013.01)

(58) Field of Classification Search
CPC ... G07F 19/20; G07F 7/1008; G06Q 20/1055; B42D 15/10
USPC ............................ 235/379, 380, 487; 705/37
See application file for complete search history.

(56) References Cited

U.S. PATENT DOCUMENTS

| 9,626,721 B2* | 4/2017 | Granbery ............. G06Q 40/025 |
| 2003/0014353 A1 | 1/2003 | Fitzherbert |
| 2007/0164102 A1 | 7/2007 | Haertel |
| 2010/0274698 A1 | 10/2010 | Bhattiprolu et al. |
| 2013/0030917 A1 | 1/2013 | Aidasani et al. |
| 2013/0080276 A1 | 3/2013 | Granbery |

* cited by examiner

*Primary Examiner* — Karl D Frech
(74) *Attorney, Agent, or Firm* — Haynes and Boone, LLP

(57) ABSTRACT

There are provided systems and methods for wireless beacon connections for providing digital letters of credit on detection of a user at a location. A payment provider may authorize use of one or more wireless beacons at a merchant location. When a user arrives at the merchant location, the user may be checked in through a communication device in possession of the user. Once checked in to the merchant location, the payment provider may determine and amount of credit to extend to the user based on the user's credit worthiness (for example, their credit rating, asset to debt ratio, etc.). The payment provider may then generate a letter of credit, which the payment provider may limit in use by time, location, etc. The payment provider may communicate the letter of credit to the user for use at the merchant location.

20 Claims, 5 Drawing Sheets

US 9,846,907 B2

WIRELESS BEACON CONNECTIONS FOR PROVIDING DIGITAL LETTERS OF CREDIT ON DETECTION OF A USER AT A LOCATION

CROSS REFERENCED TO RELATED APPLICATIONS

This application is a continuation of U.S. application Ser. No. 14/675,658, filed on Mar. 31, 2015, and issued as U.S. Pat. No. 9,626,721 on Apr. 18, 2017, the contents of which are incorporated by reference in its entirety.

TECHNICAL FIELD

The present application generally relates to wireless beacons and more specifically to wireless beacon connections for providing digital letters of credit on detection of a user at a location.

BACKGROUND

A user may visit various merchant locations where the user may wish to purchase one or more items. The user may provide cash to settle transactions, or may provide payment to the merchant using another payment instrument, such as a banking account, payment card (e.g., credit, debit, and/or gift card), or through a payment account with a payment provider. However, use of cash presents significant risk to the user, especially in large transactions where the user may not wish to place themself in risk of robbery or theft. Moreover, use of other payment instruments requires the merchant to perform backend processing to insure the legitimacy of the payment instrument and whether the payment instrument is valid for the amount of the purchase. In some cases, such as checks using a checking account, the risk of fraud or insufficient funds is significant to the merchant. Further, some merchants and/or payment providers may wish to provide credit options to the user to entice the user to purchase items. However, processing credit worthiness at the time of checkout for a transaction may be undesirable as it can be time consuming.

Figure 1:
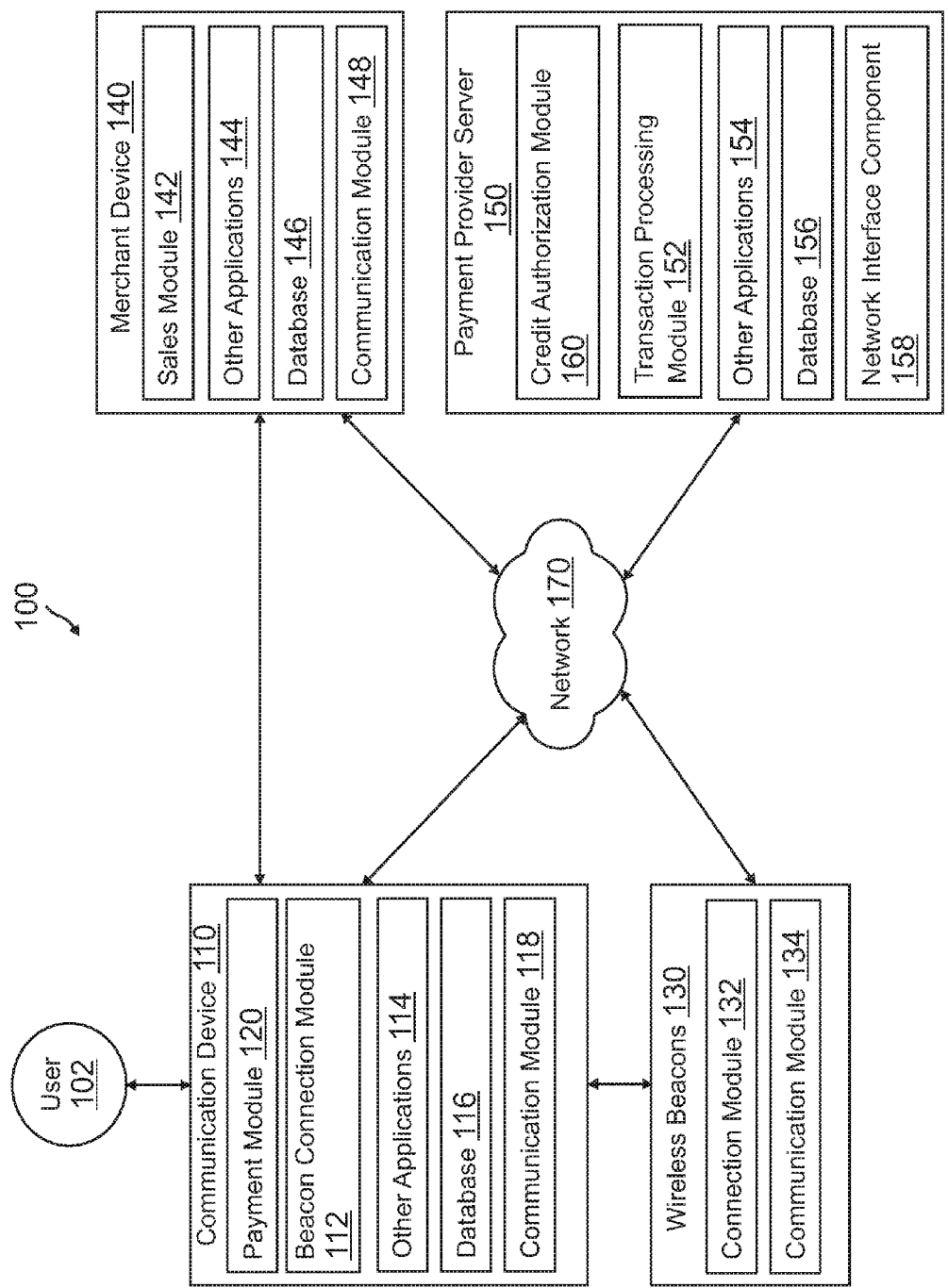
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide wireless beacon connections for providing digital letters of credit on detection of a user at a location. Systems suitable for practicing methods of the present disclosure are also provided.

Various merchant locations may provide short range wireless communications with a device for a user (e.g., a consumer or purchaser at a merchant location), such as through beacons using one or more of Bluetooth Low Energy (BLE) communication protocol, LTE Direct communication protocol, WiFi communication protocol, etc. These beacons may be set up at a location and communicate with devices to alert users of check-in services through their device. The beacons may establish a connection with a merchant device and/or server to communicate information to effectuate a check-in at the merchant location for the user and/or complete transactions between the merchant and the user. The beacons may provide additional functionality, such as establishing a connection with a payment provider server, which may offer services to the user (e.g., payment and/or credit services). The beacons may communicate with the devices directly, including information stored in the beacons. The beacons may also allow the user's device to communicate with a device or server attached to, or in communication with, the beacon, such as a device or server of a merchant and/or payment provider.

A merchant's location may offer one or more products, goods, and/or services for sale, referred to herein as an "item" or "items." The item(s) may correspond to a perishable item for sale at the merchant's location. A merchant's location may correspond to a retail store, a shopping market, a mall location, or other physical location where a user, such as a consumer or purchaser, may visit to purchase items. The merchant and/or payment provider may utilize the short range wireless beacons at the merchant's location to communicate with a device of the user. For example, the short range wireless beacons may be established throughout the merchant location, such as at an entrance of the location, throughout aisles or shopping areas of the location, and/or at a checkout counter. The beacons may employ BLE, LTE Direct, WiFi, or other communications that emit a signal receivable by the user's device. The communication may include an identifier for the beacon, the user, the merchant, and/or the payment provider.

A user may set up their communication device to passively monitor for BLE, LTE Direct, WiFi, or other communication signals from the beacon. When the communication device detects the signal and verifies the one or more identifiers, both the communication device and the beacon may ramp up in power and establish a connection, where the connection may further enable the communication device to communicate with the merchant and/or payment provider. The connection may be completed automatically when the communication device is in range of the beacon, or may be completed after prompting the user to check-in when the communication device is in range of the beacon. The connection established with the beacon may generate connection information identifying that the user has checked-in to the merchant's location through the wireless beacon. The beacon may provide the connection information to the merchant's device or server to effectuate a check-in for the user. The beacon may further provide the connection information to the payment provider, which may provide one or more payment services to the user.

Thus, the payment provider may receive connection information having an identifier for the user. The payment provider may utilize the identifier to determine how credit worthy the user is. For example, the payment provider may access, retrieve, and/or determine one or more indicators of credit worthiness for the user. Indicators of credit worthiness may include a credit rating, past transactions by the user, security verifications on identity of the user (e.g., how likely the checked-in user is actually the identified user and not a fraudulent user misrepresenting their identification), known financial accounts of the user, net worth or other value of the indicator, actual or obtainable collateral provided by the user, or other indicator of trust in financial value of the user. The payment provider may determine whether the payment provider may provide credit to the user (e.g., meeting at least a threshold score) and/or a value of the credit worthiness (e.g., an amount of credit to extend to the user, which may be dependent on the merchant, location, time, day, etc. In other embodiments, the credit may be solely dependent on user credit worthiness independent of other factors, such that the value of credit worthiness would be the same for the user at any given time, regardless of location, merchant, and other factors.

Once the payment provider has determined an amount of credit to extend to the user, the payment provider may generate a digital letter of credit to provide to the user and/or the merchant. The digital letter of credit may honor charges of up to and/or including the amount of the credit extended to the user. The digital letter of credit may allow for the user to complete payment for one or more transactions with the merchant using the digital letter of credit. The payment provider may then honor payment for the transaction(s) conducted with the digital letter of credit by providing payment to the merchant and resolving the amount with the user. For example, the digital letter of credit may allow for the user to purchase $100 of goods at the merchant using credit extended to the user, where the payment provider may provide payment for up to and including $100 of goods to the merchant on behalf of the user. The digital letter of credit may be established so that when received by the merchant, such as through a merchant device, the letter of credit verifies that the payment provider will honor the amount of credit extended to the user in the digital letter of credit. Thus, the merchant may asynchronously receive payment for a transaction less than or in the amount of the extended credit at a later point in time than during processing of the transaction.

The digital letter of credit may be limited by the amount of credit extended to the user. The digital letter of credit may further be of limited use depending on factors established by the payment provider when generating the letter of credit. For example, a limited use letter of credit may be limited in use by one or more of time, location, merchant, and/or type of purchase. The payment provider may limit an amount of time the limited use digital letter of credit is valid (e.g., 2 hours from establishment of the digital letter of credit and/or communication of the digital letter of credit to the user's communication device/merchant device), a location for where the limited use digital letter of credit is valid (e.g., only the merchant location for which the user checked in to), a merchant with which the limited use digital letter of credit is valid (e.g., the merchant name or chain for which the user checked in to), and a type of purchase with which the limited use digital letter of credit is valid (e.g., only certain items purchasable in the transaction). The credit worthiness of the user may affect the limitations on use of the digital letter of credit. Moreover, information about the user, the user's location, and/or the merchant may affect the limitations on use. For example, an amount of time a customer normally spends at the merchant, if the user is detected away from the merchant, and/or types of items for sale at the merchant's location may affect the limitations on use.

Once the limited use digital letter of credit is determined by the payment provider, the limited use digital letter of credit may be communicated to the user's communication device and/or a merchant device at the merchant's location. The merchant device may retain the limited use digital letter of credit for the user so that when the user verifies their identity on checkout for a transaction (e.g., after bringing items to a checkout counter of the merchant), the merchant may process the transaction using the limited use digital letter of credit. If the transaction exceeds the limitations on use in the limited use digital letter of credit, the merchant may request payment using another payment instrument. Moreover, the merchant may split payment between the limited use digital letter of credit and the other payment instrument(s).

In other embodiments, the user's communication device receives the limited use digital letter of credit from the payment provider. The wireless beacon may have network capabilities, which may receive the limited use digital letter of credit and communicate the limited use digital letter of credit to the user's communication device. In other embodiments, the payment provider may communicate the limited use digital letter of credit to the communication device over the network. The payment provider may digitally sign the limited use digital letter of credit using a key of a public/private key pair to authenticate the letter of credit.

Once the communication device receives the limited use digital letter of credit, the user may be alerted of the limited use digital letter of credit. The communication device may also display the limitations on use of the limited use digital letter of credit to the user. The user may then shop for items. Once the user is ready to purchase items, the user may bring the items with their communication device to a checkout counter or payment station at the merchant's location. The merchant or a merchant employee may enter the items into a transaction. The merchant may communicate the transaction to the communication device, where the user may view the details of the transaction using the communication device. The user and/or the communication device may determine whether the transaction meets the limitations on use of the limited use digital letter of credit or exceeds such limitations. If the transactions meets the limitations on use, the communication device may allow for the user to communicate the limited use digital letter of credit to the merchant device for processing of the transaction (e.g., for payment for the transaction). The communication device may transmit the limited use digital letter of credit to the merchant device using short range wireless communications, for example, one of near field communication, radio communication, infrared communication, Bluetooth communication, Bluetooth Low Energy (BLE) communication, LTE Direct communication, and WiFi communication. The limited use letter of credit may be communicated to merchant device by the communication device with a local key to authenticate the letter of credit.

The merchant may then retrieve payment from the payment provider using the limited use digital letter of credit. Since the payment provider has digitally signed the letter of credit and verified that the payment provider will later honor the amount of credit in the letter of credit, the merchant may asynchronously retrieve payment for the transaction at some later time. If the user does not use all of the credit in the limited use digital letter of credit, the merchant device may amend the letter of credit to have a leftover amount of credit after the amount for the transaction. The merchant device may therefore have the public/private key pair to amend the letter of credit. The amended letter of credit may be communicated back to the user device and may be honored for the leftover amount of credit restricted by any additional limitations on use of the limited use digital letter of credit.

Again, if the transaction exceeds the limitations on use in the limited use digital letter of credit, the merchant may request payment using another payment instrument. The user may attempt to request a new letter of credit for the amount in the transaction. In other embodiments, the user may provide payment using a payment token from the payment provider, where the payment token includes a payment instrument (e.g., a bank account, payment card, and/or payment account with the payment provider). Moreover, the merchant may split payment between the limited use digital letter of credit and the other payment instrument(s).

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, wireless beacons 130, a merchant device 140 and a payment provider server 150 in communication directly using short range wireless communications and/or over a network 170. User 102, such as a consumer. May arrive at a merchant location associated with merchant device 140 in order to purchase an item. Communication device 110 may connect with one or more of wireless beacons 130, which may provide the connection information having an identifier for user 102 and/or communication device 110 to payment provider server 150. Payment provider server 150 may determine a digital letter of credit with associated limitations on use for user 102. The limited use digital letter of credit may be communicated to at least one of communication device 110 and merchant device 140 for use in a transaction between user 102 and the merchant corresponding to merchant device 140. The merchant may then later resolve payment using the limited use digital letter of credit using merchant device 140 with payment provider server 150.

Communication device 110, wireless beacons 130, merchant device 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented using any appropriate hardware and software configured for wired and/or wireless communication with wireless beacons 130, merchant device 140, and/or payment provider server 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a payment module 120, beacon connection module 112, other applications 114, a database 116, and a communication module 118. Payment module 120, beacon connection module 112, and other applications 114 may correspond to executable processes, procedures, and/or applications with associated hardware. In other embodiments, communication device 110 may include additional or different software as required.

Payment module 120 may correspond to one or more processes to execute modules and associated specialized hardware of communication device 110 to receive a limited use digital letter of credit from payment provider server 150, display the information for the limited use digital letter of credit to user 102, and complete a transaction with merchant device 130 using the limited use digital letter of credit and/or payment tokens having another payment instrument. In this regard, payment module 120 may correspond to specialized hardware and/or software utilized to provide a convenient interface to permit user 102 to select payment options and provide payment for items to merchant device 130. For example, payment module 120 may be implemented as a user interface where user 102 may view information for a received limited use digital letter of credit. Communication device 110 may connect with one or more of wireless beacons 130, where connection information for the connection having an identifier for user 102/communication device 110 may be provided to payment provider server 150 for determination of limited use digital letter of credit, as discussed herein. Once determined, communication device 110 may receive the limited use digital letter of credit from payment provider server 150, for example, through wireless beacon 130 and/or over network 170. Payment module 120 may then display information indicating receipt of the limited use digital letter of credit as well as the limitations on use of the limited use digital letter of credit. For example, payment module 120 may display an amount of credit extended to user 102, a validity time period of the letter of credit, location validity for the letter of credit, one or more merchants that the letter of credit is valid for use with, and/or items that may be purchased using the letter of credit.

Payment module 120 may be utilized to receive a transaction from merchant device 140. Payment module 120 may determine whether the transaction meets or exceeds the limitations of the limited use digital letter of credit (i.e., whether the limited use digital letter of credit is valid for payment of the transaction). If the limited use digital letter of credit is valid for the transaction, payment module 120 may communicate the limited use digital letter of credit to merchant device 140. Payment module 120 may communicate the limited use digital letter of credit to merchant device 140 using short range wireless communications, for example, one of near field communication, radio communication, infrared communication, Bluetooth communication, Bluetooth Low Energy (BLE) communication, LTE Direct communication, and WiFi communication. User 102 may tap, swipe, or otherwise motion communication device 110 with merchant device 140 or another nearby communication module to communicate the limited use digital letter of credit. In other embodiments, payment module 120 may communicate the limited use digital letter of credit to merchant device 140, which may determine whether the transaction meets or exceeds the limitations of the limited use digital letter of credit. In such embodiments, communication device 110 may receive the results of the determination from merchant device 140 (including a request for a payment instrument or token if the limited use digital letter of credit exceeds the limitations of use).

However, where the transaction exceeds the limitations on use of the limited use digital letter of credit, payment module 102 may also allow user 102 to enter payment options for storage by communication device 110, provide those payment options on checkout/payment of one or more items, request a payment token from payment provider server 150, and/or complete a transaction for the item(s) through a purchase request for the item(s). In some embodiments, payment module 120 may correspond more generally to a web browser configured to view information available over the Internet or access a website corresponding to a payment service provider (e.g., payment provider server 150). Payment module 120 and/or payment provider server 150 may utilize user financial information, such as a credit card, bank account, or other financial account, as a payment instrument when providing payment information in the form of a payment token to merchant device 130. Additionally, a user account with payment provider, such as payment provider server 150, may be utilized as the payment instrument. In various embodiments, the payment token may be communicated to merchant device 130 directly or through one or more of wireless beacons 130. The payment token may also include identification of the item(s) for purchase and a request to purchase the items. Payment module 120 may also receive a transaction history, such as a receipt, from one or more of merchant device 140 and payment provider server 150.

Beacon connection module 112 may correspond to one or more processes to execute modules and associated devices of communication device 110 to establish a connection with one or more of wireless beacons 130 established throughout the merchant location. In this regard, beacon connection module 112 may correspond to specialized hardware and/or software utilized to connect to one or more of wireless beacons 130 in order to receive short range wireless communications from wireless beacons 130 at the merchant location and transmit information to wireless beacons 130, including check-in information for a check-in process with merchant device 140 (e.g., an identifier for user 102/communication device 110). Wireless beacons 130 may be located within, nearby, or associated with the merchant location and/or a sub-location within the merchant location, such as an entrance, aisle, sales area, and/or checkout. Beacon connection module 112 may communicate with one or more of wireless beacons 130 to generate connection information for user 102. The connection information may identify user 102 as located at the merchant location and/or sub-location. The connection information may further include an identifier for user 102 and/or communication device 110, which may be communicated to payment provider server 150 by wireless beacons 130, as discussed herein.

Beacon connection module 112 may execute in the background of an operating system of communication device 110 and be configured to establish connections, using communication module 118 of communication device 110, with one or more of wireless beacons 130. The connection may be established with or without user input from user 102. For example, wireless beacons 130 may broadcast a token, such as a universally unique identifier (UUID), for reception by beacon connection module 112, as will be explained in more detail herein. Beacon connection module 112 may utilize communication module 118 of communication device 110 to receive the token. If beacon connection module 112 acknowledges the UUID as identifying wireless beacons 130, merchant device 140, and/or payment provider server 150 (e.g., if beacon connection module 112 determines the UUID corresponds to a request to complete a check-in), beacon connection module 112 may transmit an identifier corresponding to user 102 and/or communication device 110 back to the one or more of wireless beacons 130 transmitting the first identifier. Beacon connection module 112 may utilize communication module 118 of communication device 110 to communicate with one or more of wireless beacons 130 (e.g., over near field communication, Bluetooth, Bluetooth Low Energy, radio, infrared, LTE Direct, or other connection). The identifier from communication device 110 may include, be transmitted with, concatenated with, or otherwise bundled with the identifier received from the one or more of wireless beacons 130 transmitting the first identifier. In other embodiments, different information may be transmitted to wireless beacons 130, such as a name or other personal information for user 102. Thus, the information transmitted to wireless beacons 130 does not need to be utilized to process and/or complete a check-in with merchant device 140 in all embodiments. Once a connection is established with beacon connection module 112, one or more of wireless beacons 130 may communicate information to communication device 110, such a limited use digital letter of credit and/or payment token for use by payment module 120.

In various embodiments, one or more features of payment module 120 and/or beacon connection module 112 may be incorporated in the same application so as to provide their respective features in one application.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through a network. In various embodiments, other applications 114 may include financial applications, such as banking, online payments, money transfer, or other applications associated with payment provider server 170. Other applications 114 may include browser, social networking, and/or mapping applications, which may also be used in conjunction with beacon connection module 112 and/or payment module 120. Other applications 114 may contain software programs, executable by a processor, including a graphical user interface (GUI) configured to provide an interface to the user.

Communication device 110 may further include database 116 which may include, for example, identifiers such as operating system registry entries, cookies associated with payment module 120, beacon connection module 112, and/or other applications 114, identifiers associated with hardware of communication device 110, or other appropriate identifiers, such as identifiers used for payment/user/device authentication or identification. Identifiers in database 116 may be used by a payment/credit provider to associate communication device 110 with a particular account maintained by the payment/credit provider. Database 116 may include communication device tokens and/or encryption keys, including an encryption key of wireless beacons 130, and/or payment provider server 150. Database 116 may include received information, including a limited use digital letter of credit, a public key of a private/public (e.g., asymmetric) key pair used to sign the limited use digital letter of credit, a payment token, and/or transaction information.

Communication device 110 includes at least one communication module 118 adapted to communicate with wireless beacons 130, merchant device 140, and/or payment provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 130 using short range communications, such as Bluetooth Low Energy, LTE Direct, radio frequency, infrared, Bluetooth, and near field communications.

Wireless beacons 130 may be maintained, for example, by a merchant for merchant device 140 and/or payment provider server 150. Wireless beacons 130 may be implemented using any appropriate hardware and software configured for wireless communication with communication device 110, merchant device 140, and/or payment provider server 150. For example, in one embodiment, wireless beacons 130 may be implemented as a dongle device including a hardware processor and a communication module, for example, connected to device at the location of the merchant. Wireless beacons 130 may also be implemented as a device incorporated within a personal computer (PC), a smart phone, laptop/tablet computer, and/or other types of computing devices capable of transmitting and/or receiving data. Wireless beacons 130 may also act as a stand-alone device including a processor, communication module, and/or network interface component configured to communicate with communication device 110, merchant device 140, and/or payment provider server 150. Although wireless beacons 130 are described as a plurality of wireless beacons set up at a merchant location for merchant device 140, in various embodiments, wireless beacons 130 may correspond to a single wireless beacon established at the merchant location and/or a sub-location within the merchant location.

Wireless beacons 130 may be located at a physical location corresponding to merchant device 140 (e.g., a merchant location, such as a retail location, merchant storefront, etc.). Wireless beacons 130 of FIG. 1 contains processes, procedures, and/or applications executable by a hardware processor, for example, a software program, configured to interact with communication device 110, merchant device 140, and/or payment provider server 150. Thus, regardless of the implementation of wireless beacons 130, as discussed above, each of wireless beacons 130 utilize a connection module 132 and a communication module 134. In other embodiments, wireless beacons 130 may include additional or different software and devices as required.

Connection module 132 may correspond to an application for transmitting requests to establish a connection between a device (e.g., communication device 110) and one of wireless beacons 130. The requests may be unique to each of wireless beacons 130 and form a connection with only the matching one of wireless beacons 130. Thus, wireless beacons 130 may utilize short range wireless communications (e.g., BLE, LTE Direct, WiFi, etc.) of wireless beacons 130 to transmit the requests to establish a connection, including an identifier such as a Universally Unique Identifier (UUID). If communication device 110 receives a request to establish the connection with wireless beacons 130 and responds with an identifier for user 102/communication device 110 (potentially including the UUID and other information necessary to effectuate a check-in for user 102), wireless beacons 130 to ramp up in power and create a connection between communication device 110 and one of wireless beacons 130.

Each of wireless beacons 130 may uniquely transmit the request to establish the connection with wireless beacons 130 as a short range wireless communication (e.g. a BLE protocol communication) including a "wake up" process and/or a token for the one of wireless beacons 130 transmitting the request. In other embodiments, the request and/or connection may utilize near field communication, radio communication, infrared communication, or Bluetooth communication. Additionally, although wireless beacons 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 130 (e.g., communication device 110) and establishment of a connection for data transfers.

Communication device 110 may only pick up the request based on the signal range and/or physical context for one of wireless beacons 130 transmitting the request within the location. For example, one of wireless beacons 130 established at a merchant location and may be limited in range only to connect to communication device 110 if communication device 110 is located at the merchant location. Once connected, connection information may be generated that may include an identifier for user 102/communication device 110. After connection module 132 receives an identifier from communication device 110, connection module 132 may communicate the connection information with the identifier to payment provider server 150 for determination of a limited use digital letter of credit. Additionally, connection module 132 may cause wireless beacons 130 to keep a communication channel open between communication device 110, merchant device 140, and/or payment provider server 150 for passing additional information, such as the limited use digital letter of credit to merchant device 140 and/or obtaining a payment token from payment provider server 150 when necessary.

In various embodiments, wireless beacons 130 includes at least one communication module 134 adapted to communicate with communication device 110, merchant device 140, and/or payment provider server 150. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate with communication device 110 and/or merchant device 140 using short range communications, such as radio frequency, infrared, Bluetooth, and near field communications.

Merchant device 140 may be implemented using any appropriate hardware and software configured for wired and/or wireless communication with communication device 110, wireless beacons 130, and/or payment provider server 150. For example, merchant device 140 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly, for example, in possession of one or more merchants or merchant employees at a merchant location.

Merchant device 140 of FIG. 1 contains a sales module 142, other applications 144, a database 146, and a communication module 148. Sales module 142 and other applications 144 may correspond to processes, procedures, and/or applications executable by a hardware processor, for example, a software program. In other embodiments, merchant device 140 may include additional or different software as required.

Sales module 142 may correspond to one or more processes to execute modules and associated devices of merchant device 140 to provide a convenient interface to permit a merchant for merchant device 140 to enter, view, and/or process items/services user 102 wishes to purchase. In this regard, sales module 142 may correspond to specialized hardware and/or software utilized by merchant device 140 that may be implemented as an application having a user interface enabling the merchant to enter the items user 102 has selected for purchase (e.g., through input by the merchant and/or user 102, scanning the items, etc.). Sales module 142 may further enable the merchant to view the items for purchase by user 102, enter coupons and/or discounts for the items, edit the order including adding, removing, and/or modifying items, or other functions with regards the selected items/services. Once the items have been arranged into an order for purchase by user 102, a total may be calculated and a transaction may be engaged with user 102 to complete payment for the selected items. Sales module 142 may request payment covering the selected items from user 102. Thus, sales module 142 may receive a payment instrument from user 102 to complete a transaction for the selected items. The payment instrument may correspond to cash, payment cards, checks, and/or payment accounts with payment provider server 170, in various embodiments. The payment instrument may also correspond to a limited use digital letter of credit, as discussed herein. Sales module 142 may later (e.g., asynchronously) resolve payment for the transaction using the limited use digital letter of credit with payment provider server 150. Where the limitations of use of the limited use digital letter of credit are exceeded by the transaction, the payment instrument may instead correspond to a payment token generated by payment provider server 150. Once a transaction is processed and/or completed by sales module 142 for the selected items by user 102, a transaction history (e.g., receipt) may be generated and provided to one or more of user 102, communication device 110, and/or payment provider server 150.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 170, or other types of applications. In various embodiments, other applications 144 may include financial applications, such as banking, online payments, money transfer, or other applications associated with payment provider server 170. Other applications 144 may contain other software programs, executable by a processor, including a graphical user interface (GUI) configured to provide an interface to the user.

Merchant device 140 may further include database 146 which may include, for example, identifiers such as operating system registry entries, cookies associated with item tag monitoring module 160, sales module 142, and/or other applications 144, identifiers associated with hardware of merchant device 140, or other appropriate identifiers, such as identifiers used for payment/user/device authentication or identification. Database 146 may also store user 102's information, including check-in information, an identifier, etc., for user 102. Database 146 may include payment instruments, past transaction histories, expected checkout times, and/or other past information for user 102. Database 146 may also store received information, such as a limited use digital letter of credit and/or a payment token.

Merchant device 140 includes at least one communication module 148 adapted to communicate with communication device 110, wireless beacons 130, and/or payment provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with communication device 110 and/or wireless beacons 130 using short range communications, such as Bluetooth Low Energy, LTE Direct, radio frequency, infrared, Bluetooth, and near field communications.

Payment provider server 150 may be maintained, for example, by an online payment service provider, which may provide payment services and/or processing for financial transactions on behalf of users, including processing of received payment tokens for a transaction. In this regard, payment provider server 150 includes one or more processing applications which may be configured to interact with communication device 110, wireless beacons, and/or merchant device 140 to facilitate payment for a transaction. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to user 102 and/or the merchant associated with merchant device 130.

Payment provider server 150 of FIG. 1 includes credit authorization module 160, a transaction processing module 152, other applications 154, a database 156, and a network interface component 158. Credit authorization module 160, transaction processing module 152, and other applications 154 may correspond to executable processes, procedures, and/or applications with associated hardware. In other embodiments, payment provider server 150 may include additional or different modules having specialized hardware and/or software as required.

Credit authorization module 160 may correspond to one or more processes to execute modules and associated specialized hardware of payment provider server 150 to access connection information generated by a connection between communication device 110 and one or more of wireless beacons 130, determine credit eligibility and/or worthiness of user 102 using an identifier in the connection information, determine a limited use digital letter of credit using the credit eligibility, and communicate the limited use digital letter of credit to communication device 110, wireless beacons 130 and/or merchant device 140. In this regard, transaction processing module 152 may correspond to specialized hardware and/or software to access the connection information, for example, from database 156. The connection information may include an identifier for user 102 and/or communication device 110. Using the identifier, information for the user may be determined. For example, the identifier may be used to access user information, such as a name, address, or other identification information. The user information may further include at least one financial indicator of credit worthiness of user 102, such as a credit rating, available collateral, available funds, past transaction histories, debts of user 102, and assets of user 102. The financial indicator(s) may be used to determine an amount of credit to extend to user 102. Thus, once the user information for user 102 is accessed using the identifier, credit authorization module 160 may determine whether to extend credit to user 102 and how much credit to extend to user 102.

Based on the amount of credit to extend to user 102, a digital letter of credit for user 102 may be determined. The digital letter of credit may also include limitations on use so that the digital letter of credit may only be utilized in conformity with one or more terms limiting the use of the digital letter of credit. Limitations on use of the digital letter of credit may include time limitations, location limitations, merchant with which the digital letter of credit may be utilized, and/or items that the digital letter of credit may be used to purchase. Once the limitations on use are determined, a limited use digital of credit may be determined having the amount of credit and the limitations on use. The limited use digital letter of credit may be communicated to wireless beacons 130 for communication to communication device 110. In other embodiments, the limited use digital letter of credit may be communicated directly to communication device 110 and/or merchant device 140. Credit authorization module 160 may further digitally sign the limited use digital letter of credit using an asymmetric key pair and provide a public key to communication device 110 and/or merchant device 140 to authenticate the limited use digital letter of credit. User 102 may then utilize the limited use digital letter of credit to provide payment to merchant device 140, as discussed herein. Thus, when the merchant associated with merchant device 140 wishes to resolve the payment with payment provider server 150, the merchant (e.g., through merchant device 140) may provide the limited use digital letter of credit to payment provider server 150 with terms of the transaction (e.g., a payment amount), which may provide payment through transaction processing module 152. Where the transaction does not meet the terms of the limited use digital letter of credit, user 102 may request a payment token from transaction processing module 152 as well.

Transaction processing module 152 may correspond to one or more processes to execute modules and associated specialized hardware of payment provider server 150 to receive and/or transmit information from communication device 110 and/or merchant device 140 for processing and completion of one or more transactions initiated by user 102. In this regard, transaction processing module 152 may correspond to specialized hardware and/or software to process a received transaction from communication device 110 and/or merchant device 140 by receiving the transaction from communication device 110 and/or merchant device 140 with a payment request for a payment for the transaction. The payment request may identify a limited use digital letter of credit or a payment token, including a payment instrument and identification of the transaction, and may be encrypted prior to transmission to transaction processing module 152 to prevent unauthorized receipt of a payment instrument. Where the payment request identifies a limited use digital letter of credit, transaction processing module 152 may provide payment to the merchant associated with merchant device 140 (e.g., to a merchant account for the merchant). Transaction processing module 152 may then require payment from user 102, such as from a payment instrument stored to payment provider server 150 and/or a bill sent to user 102 for payment.

Where user 102 requires a payment token from transaction processing module 152, the payment token may include information corresponding to user identifiers, user financial information/identifiers, transaction information and/or other identifiers. Additionally, the payment token may include a payment amount and terms of payment for the transaction. Once received, transaction processing module 152 may utilize a payment account or financial information (e.g., a payment instrument such as a credit/debit card, bank account, etc.) of user 102 to render payment for the transaction. Transaction processing module 152 may receive purchase authorizations, in certain embodiments, and process payments for transaction in accordance with the purchase authorizations. Payment may be made to merchant device 140 using the payment instrument and the terms of the payment request. Additionally, transaction processing module 152 may provide transaction histories, including receipts, to communication device 110, merchant device 130, and/or merchant server 140 for completion and documentation of the financial transaction. Such transaction histories may be utilized to determine additional items required with future purchases by user 102 and/or other users.

In various embodiments, payment provider server 150 includes other applications 154 as may be desired in particular embodiments to provide features to payment provider server 150. For example, other applications 154 may include security applications for implementing client-side security features, programmatic client applications for interfacing with appropriate application programming interfaces (APIs) over network 170, or other types of applications. Other applications 154 may contain software programs, executable by a processor, including a graphical user interface (GUI), configured to provide an interface to user 102 when accessing payment provider server 150. In various embodiments where not provided by credit authorization module 160 and/or transaction processing module 152, other applications 154 may include connection and/or communication applications, which may be utilized to communication information to communication device 110 and/or merchant device 130.

Additionally, payment provider server 150 includes database 156. As previously discussed, user 102 and/or the merchant corresponding to merchant device 140 may establish one or more payment accounts with payment provider server 150. Payment accounts in database 156 may include user/merchant information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 150, e.g. from communication device 110 and/or merchant device 140, a payment account belonging to user 102 and/or the merchant may be found. Payment amounts may be deducted from one payment account and paid to another payment account. In other embodiments, user 102 and/or the merchant may not have previously established a payment account and may provide other financial information to payment provider server 150 to complete financial transactions, as previously discussed. Database 156 may further include information used by credit authorization module 160, such as user information used to determine an amount of credit to extend to user 102 and/or user/merchant/location information used to determine limitation on use of a digital letter of credit.

In various embodiments, payment provider server 150 includes at least one network interface component 158 adapted to communicate communication device 110, wireless beacons 130, and/or merchant device 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
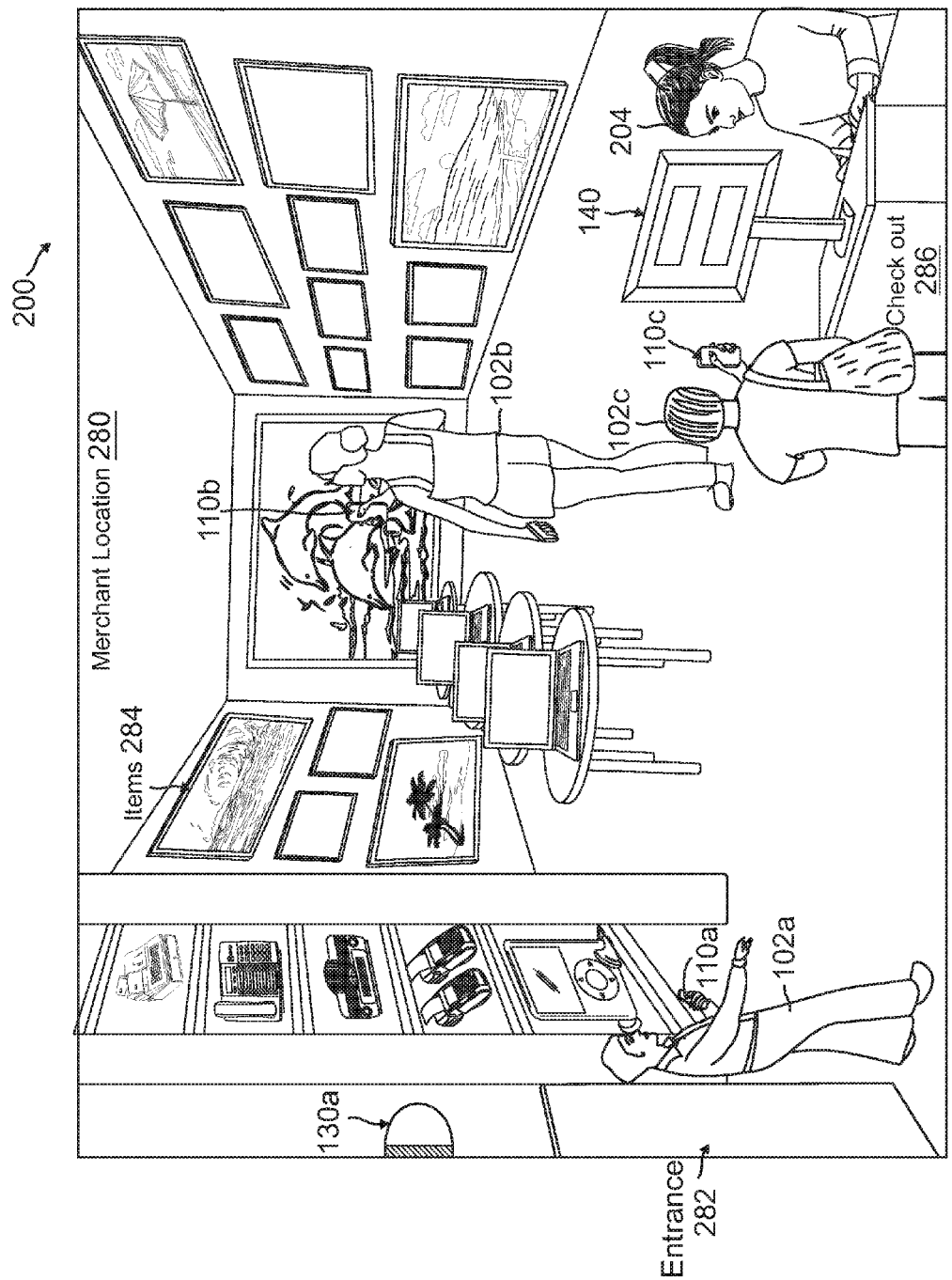
FIG. 2 is an exemplary merchant environment with users receiving limited use digital letters of credit on arrival at a merchant location for use in transactions with a merchant at the merchant location, according to an embodiment.

FIG. 2 is an exemplary merchant environment with users receiving limited use digital letters of credit on arrival or checkin at a merchant location for use in transactions with a merchant at the merchant location, according to an embodiment. Environment 200 of FIG. 2 includes a user 102a utilizing a communication device 110a, a user 102b utilizing a communication device 110b, and a user 102c utilizing a communication device 110c, all corresponding generally to user 102 utilizing communication device 110, respectively, of FIG. 1. Environment 200 further includes a wireless beacon 130a corresponding generally to one or more of wireless beacons 130 of FIG. 1.

Environment 200 includes a merchant location 280 where users 102a-c may visit in order to purchase items 284, such as televisions, computers, and other electronics. Wireless beacon 130a may be established at an entrance 282 so that when users 102a-c pass through entrance 282 to shop at merchant location 280, communication devices 110a-c may pair with wireless beacon 130a and generate connection information having an identifier for user 102a-c, respectively. For example, when arriving at merchant location 280, user 102a in possession of communication device 110a may have communication device 110a connect with wireless beacon 130a. The connection may establish connection information identifying user 102a as located at merchant location. The connection information may be communicated to a payment provider server, which may then determine a limited use digital letter of credit for user 102a. Similarly, limited use digital letters of credit may also be determined for users 102b and 102c when arriving at merchant location 280.

While shopping at merchant location 280, user 102b may view one or more of items 284 that user 102b may wish to purchase. User 102b may have previously received a limited use digital letter of credit on arrival at merchant location 280 through communication device 110b. However, the limited use digital letter of credit for user 102b may have expired while shopping items 284 or a selected item from items 284 may not meet limitations on use of the limited use digital letter of credit. Thus, user 102b may require an updated or new limited use digital letter of credit, or user 102b may request a payment token to complete payment for the selected item using communication device 110b. For example, communication device 110b may pair with wireless beacon 130a again and request another limited use digital letter of credit if the previous letter of credit has expired. However, if the limitations of use of a digital letter of credit provided to user 102b are exceeded by the item, user 102b may be required to provide payment using another payment instrument and/or payment token from the payment provider (i.e., not using credit extended to user 102b).

User 102c is shown at a checkout 286 where user 102c may complete payment for an item by providing payment to merchant 204. User 102c may have a valid limited use digital letter of credit, which may cover payment for an item user 102c wishes to purchase at checkout 286. Thus, user 102c may provide the limited use digital letter of credit to merchant 204. User 102c may communicate the limited use digital letter of credit to merchant device 140 using communication device 110c. Such communications may utilize short range wireless communications between communication device 110c and merchant device 140. The limited use digital letter of credit may also be communicated to merchant device 140 with a local key allowing for authentication of the letter of credit. Merchant 204 may then complete the transaction with user 102c using the letter of credit, and may later resolve payment for the transaction with a payment provider issuing the letter of credit. Merchant 204 may asynchronously resolve the payment with the payment provider so that the transaction is quickly completed with user 102c without the need for communication with the payment provider by merchant device 140. The payment provider may honor the payment amount in the letter of credit, and may retrieve payment from user 102c, such as through a payment account or payment instrument held by the payment provider or issuing a bill to user 102c.

Figure 3:
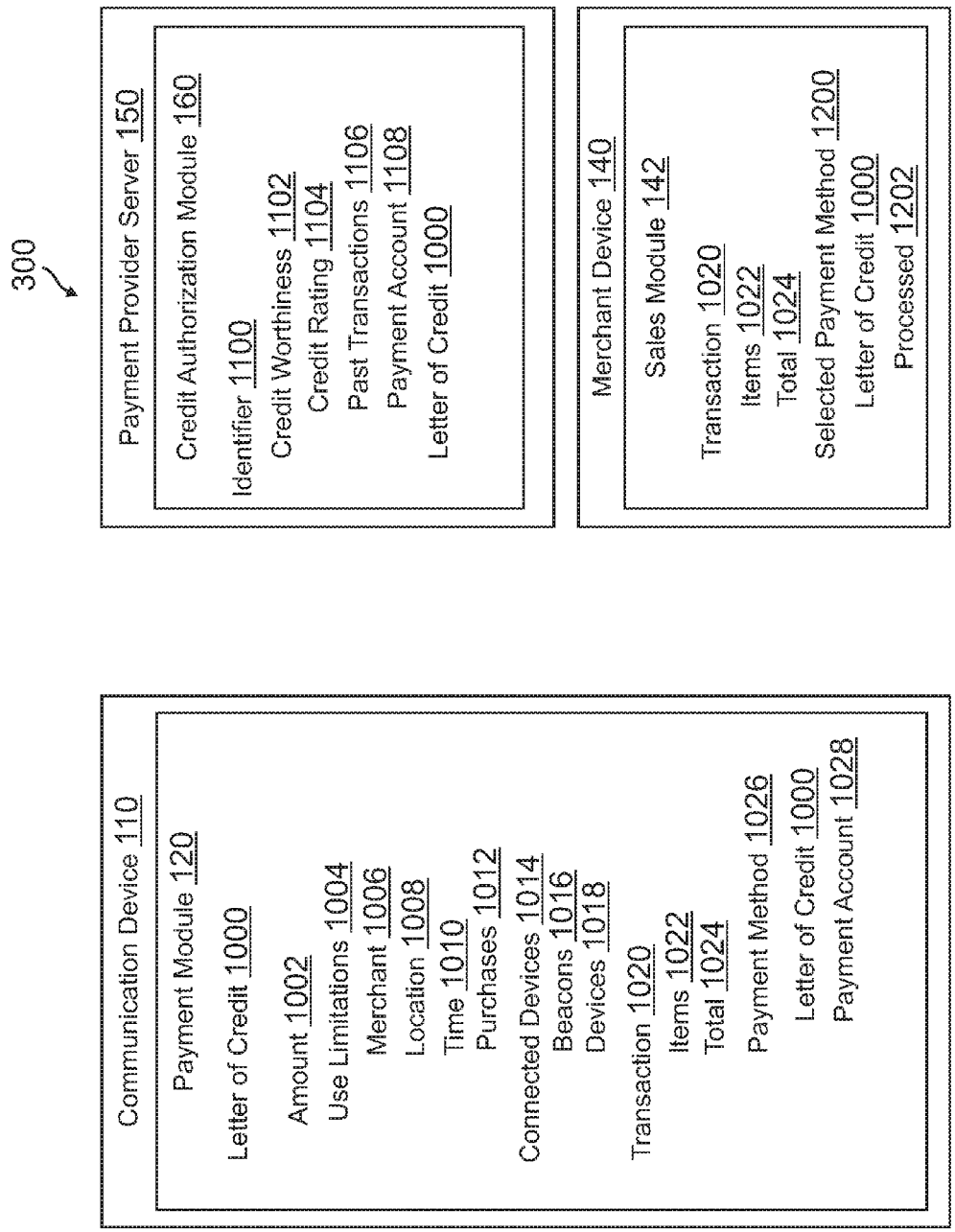
FIG. 3 is an exemplary system environment showing a user's communication device receiving a limited use digital letter of credit from a payment provider based on the user's credit worthiness and utilizing the limited use digital letter of credit for a transaction with a merchant device, according to an embodiment.

FIG. 3 is an exemplary system environment showing a user's communication device receiving a limited use digital letter of credit from a payment provider based on the user's credit worthiness and utilizing the limited use digital letter of credit for a transaction with a merchant device, according to an embodiment. Environment 300 includes communication device 110, merchant device 140, and payment provider server 150 of FIG. 1. The below described hardware and/or software modules execute functions as described herein with respect to environment 100.

Communication device 110 executes payment module 120 having specialized hardware and/or software modules and processes described herein in reference to FIG. 1. In this regard, payment module 120 displays one or more limited use digital letters of credit provided to a user (not shown) of communication device 110 after determination of the limited use digital letter(s) of credit by payment provider server 150. Communication device 110 may first connect with a wireless beacon on arrival at a merchant location to generate connection information having an identifier for the user/communication device 110. The connection information may be communicated to payment provider server 150, which executes credit authorization module 160 having specialized hardware and/or software modules and processes described herein in reference to FIG. 1. Thus, credit authorization module 160 includes an identifier 1100 from the connection information. Identifier 1100 may be utilized to determine credit worthiness 1102, such as information for a credit rating 1104, past transactions 1106, and payment account 1108. Using credit worthiness 1102, credit authorization module 160 may determine a letter of credit 1000, which may be communicated to communication device 110.

Payment module 120 includes letter of credit 1000, which may include an amount of credit and limitations on use of letter of credit 1000. Thus, letter of credit 1000 includes amount 1002 of extended credit to the user, and use limitation 1004 having limitations on use with a merchant 1006, a location 1008, a time 1010, and purchases 1012. Payment module 120 may further include information for connected device 1014, which may display devices and/or beacons that communication device 110 is connected with for use in obtaining letter of credit 1000 and/or completing a transaction. Connected devices 1014 include beacons 1016 (e.g., a wireless beacon) and devices 1018 (e.g., merchant device 140). Payment module 120 may receive transaction information, which may be processed by payment module 120 to determine if letter of credit 1000 may be utilized for a transaction 1020. Transaction 1020 includes items 1022, a total 1024, and a selected option for a payment method 1026, such as letter of credit 1000 and/or payment account 1028. In other embodiments, merchant device 140 may determine whether letter of credit 1000 may be utilized for transaction 1020.

Merchant device 140 executes a sales module 142 having specialized hardware and/or software modules and processes described herein in reference to FIG. 1. Sales module 142 may be utilized to complete transaction 1020 with communication device 110, for example, using letter of credit 1000. In this regard, sales module 142 includes transaction 1020 having items 1022 and a total 1024. In order to complete transaction 1020, sales module 142 may require a payment instrument to be provided by the user of communication device 110. Thus, sales module 142 further includes a selected payment method 1200 having letter of credit 1000 communicated by communication device 110 to merchant device 140. Sales module 142 may further process letter of credit 1000 to generate a processed 1202 status for completion of transaction 1020.

Figure 4:
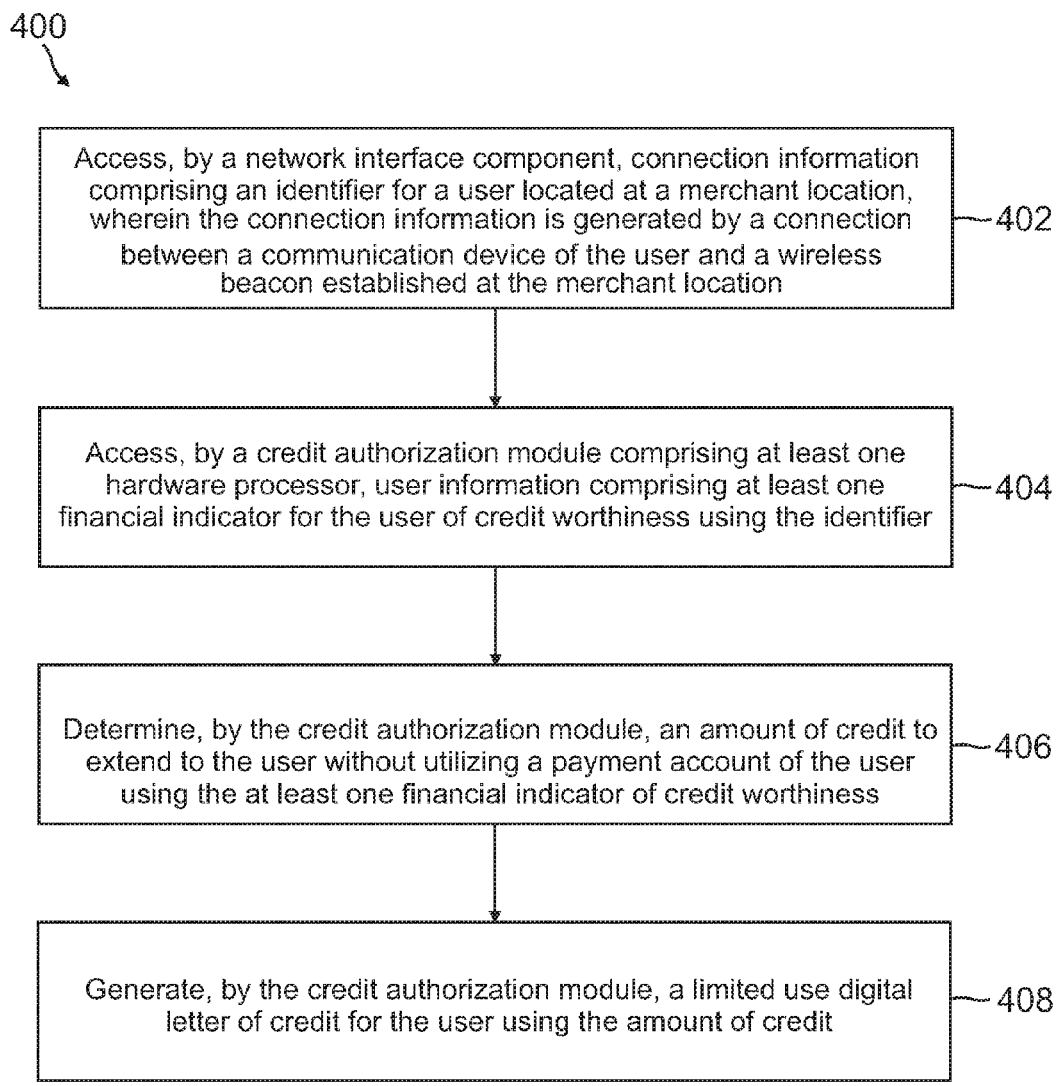
FIG. 4 is a flowchart of an exemplary process for wireless beacon connections for providing digital lets of credit on detection of a user at a location, according to an embodiment.

FIG. 4 is a flowchart of an exemplary process for wireless beacon connections for providing digital letters of credit on detection of a user at a location, according to an embodiment. Note that one or more steps, processes, and methods described herein may be omitted, performed in a different sequence, or combined as desired or appropriate.

At step 402, connection information comprising an identifier for a user located at a merchant location is received, by a network interface component, wherein the first connection information is generated by a first connection between a communication device of the user and a wireless beacon established at the merchant location using short range wireless communications. The connection information may then be accessed by a credit authorization module comprising at least one hardware processor. User information comprising at least one financial indicator of credit worthiness for the user is accessed, by the credit authorization module, using the identifier, at step 404. An amount of credit to extend to the user without utilizing a payment account of the user is determined, using the at least one financial indicator of credit worthiness, by the credit authorization module, at step 406.

At step 408, a limited use digital letter of credit for the user is generated, by the credit authorization module, using the amount of credit. The limited use digital letter of credit may be limited in use by an amount of time the limited use digital letter of credit is valid for, a location for where the limited use digital letter of credit is valid, a merchant with which the limited use digital letter of credit is valid, and a type of purchase with which the limited use digital letter of credit is valid. The communication device may communicate the limited use digital letter of credit to a merchant device to process a payment for a transaction between the user and a merchant associated with the merchant device. The communication device may communicate the limited use digital letter of credit to the merchant device using short range wireless communications comprising one of near field communication, radio communication, infrared communication, Bluetooth communication, Bluetooth Low Energy (BLE) communication, LTE Direct communication, and WiFi communication. Thus, the merchant device may receive the payment for the transaction from a payment provider using the limited use digital letter of credit, which may occur asynchronously from completing the transaction with the user. A transaction processing module may provide the payment to the merchant and resolve an amount for the payment with the user using at least one of a banking account of the user, a payment card of the user, and a payment account of the user with the payment provider.

The merchant device may determine whether the transaction exceeds limitations (including not meeting conditions) on use of the limited use digital letter of credit. For example, the merchant device may process the transaction using the limited use digital letter of credit if the transaction does not exceed the limitations on use of the limited use digital letter of credit. However, the merchant device may request a different payment instrument if the transaction exceeds the limitations on use of the limited use digital letter of credit. The different payment instrument may comprise at least one of a banking account of the user, a payment card of the user, and a payment account of the user with the payment provider. In such embodiments, the transaction processing module may receive a request for a payment token from the communication device of the user and generates the payment token using at least one of the banking account, the payment card, and the payment account, wherein the merchant device receives a payment for the transaction using the payment token. In other embodiments, the communication device may receive a transaction between the user and a merchant from a merchant device for the merchant, wherein the communication device determines whether the transaction exceeds limitations on use of the limited use digital letter of credit. The communication device may also request one of a new letter of credit and a payment token if the transaction exceeds the limitations on use of the limited use digital letter of credit.

The limited use digital letter of credit may be renewed if the limited use digital letter of credit expires. For example, the credit authorization module may determine that the limited use digital letter of credit has expired based on limitation of use of the limited use digital letter of credit. The credit authorization module may then determine that the user is located at the merchant location in order to renew the limited use digital letter of credit. The credit authorization module may determine that the user is located at the merchant location by receiving second communication information comprising a second connection between the communication device of the user and the wireless beacon established at the merchant location using the short range wireless communications. After processing of a transaction using the limited use digital letter of credit, one of the communication device and a merchant device at the merchant location may amend the limited use digital letter of credit after processing a payment to a merchant at the merchant location to generate a new letter of credit having a leftover amount after the payment to the merchant.

Figure 5:
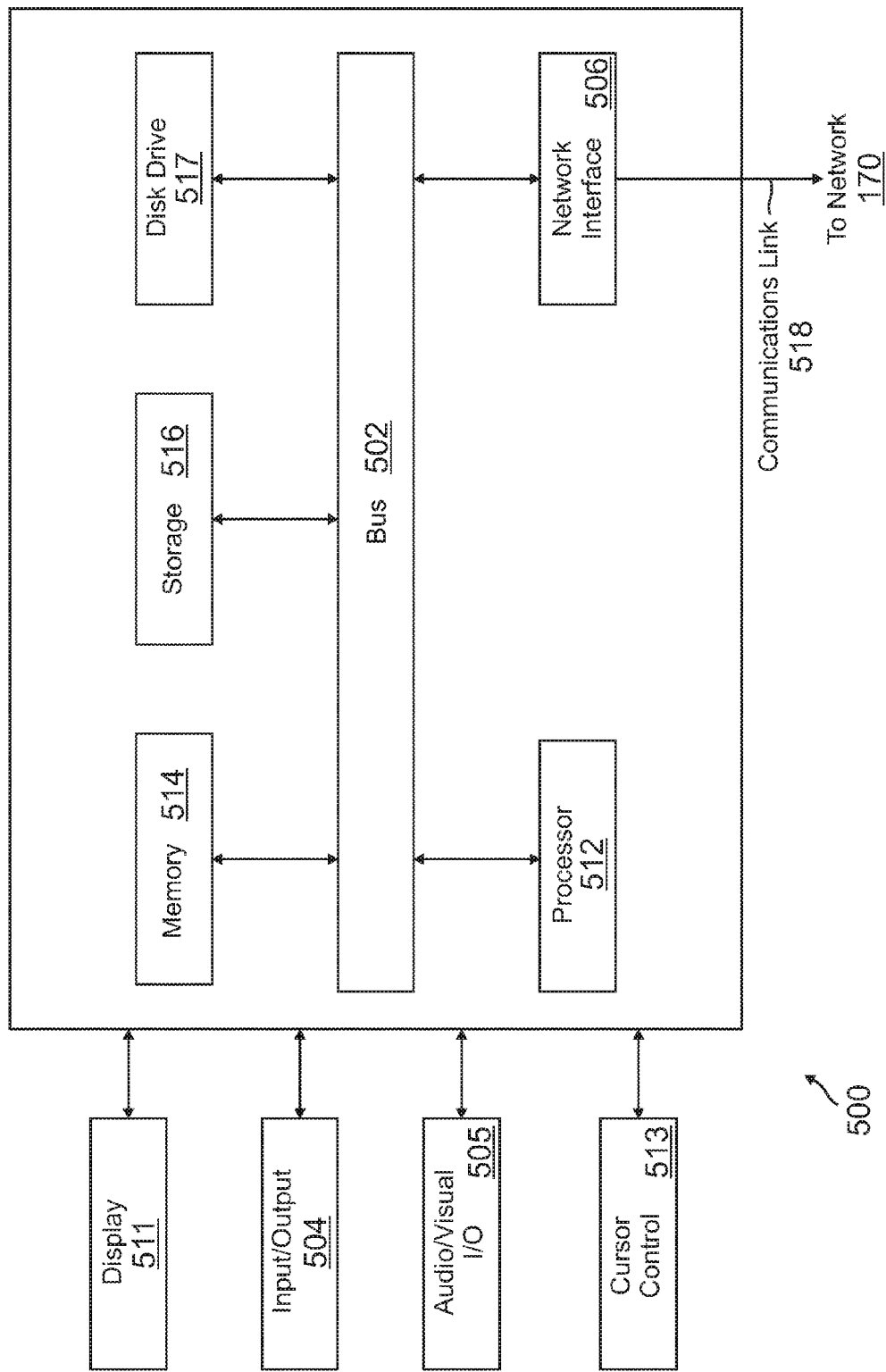
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device comprising:
    a non-transitory memory storing instructions; and
    a processor configured to execute the instructions to cause the device to:
        execute, on a display of the device, a user interface for a payment application;
        detect, over a network connection, a merchant device at a merchant location in proximity to the device;
        transmit, over the network connection, connection information comprising a user identifier to the merchant device: and
        receive, over the network connection, a notification presenting on the user interface of the payment application, a digital letter of credit for a merchant corresponding to the merchant location of the merchant device, the digital letter of credit received in response to a determination of an amount of credit to extend to a user associated with the device, the amount of credit determined based on a financial indicator of credit worthiness determined from the user identifier.

2. The device of claim 1, wherein the digital letter of credit is automatically determined by a payment provider associated with the payment application.

3. The device of claim 2, wherein the device communicates the digital letter of credit to the merchant device to process payment for a transaction between the user and the merchant.

4. The device of claim 3, wherein the merchant device receives the payment for the transaction from the payment provider using the digital letter of credit.

5. The device of claim 1, wherein the digital letter of credit is modified by the merchant device.

6. The device of claim 1, executing the instructions further causes the device to:
    transmit, over the network connection, a request for a credit increase on the digital letter of credit.

7. The device of claim 1, wherein the digital letter of credit is a limited used digital letter of credit.

8. The device of claim 7, wherein digital letter of credit is limited in one of time, merchant location, and amount.

9. A method comprising:
    executing, on a display of a device, a user interface for a payment application;
    detecting, over a network connection, a merchant device at a merchant location in proximity to the device;
    transmitting, over the network connection, connection information comprising a user identifier to the merchant device; and
    receiving, over the network connection, a notification presenting on the user interface of the payment application, a digital letter of credit for a merchant corresponding to the merchant location of the merchant device, the digital letter of credit received in response to a determination of an amount of credit to extend to a user associated with the device, the amount of credit determined based on a financial indicator of credit worthiness determined from the user identifier.

10. The method of claim 9, wherein the digital letter of credit is automatically determined by a payment provider associated with the payment application.

11. The method of claim 10, wherein the device communicates the digital letter of credit to the merchant device to process payment for a transaction between the user and the merchant.

12. The method of claim 11, wherein the merchant device receives the payment for the transaction from the payment provider using the digital letter of credit.

13. The method of claim 9, wherein the digital letter of credit modified by the merchant device.

14. The method of claim 9, further comprising:
    transmitting, over the network connection, a request for a credit increase on the digital letter of credit.

15. The method of claim 9, wherein the digital letter of credit is a limited used digital letter of credit.

16. A non-transitory machine-readable medium having instructions stored thereon, the instructions executable to cause performance of operations comprising:
    executing, on a display of a device, a user interface for a payment application;
    detect, over a network connection, a merchant device at a merchant location in proximity to the device;
    transmitting, over the network connection, connection information comprising a user identifier to the merchant device; and
    receiving, over the network connection, a notification presenting on the user interface of the payment application, a digital letter of credit for a merchant corresponding to the merchant location of the merchant device, the digital letter of credit received in response to a determination of an amount of credit to extend to a user associated with the device, the amount of credit determined based on a financial indicator of credit worthiness determined from the user identifier.

17. The non-transitory machine-readable medium of claim 16, wherein the digital letter of credit is automatically determined by a payment provider associated with the payment application.

18. The non-transitory machine-readable medium of claim16, wherein the operations further comprise:
    transmitting, over the network connection, a request for a credit increase on the digital letter of credit.

19. The non-transitory machine-readable medium of claim 16, wherein the digital letter of credit is a limited used digital letter of credit.

20. The non-transitory machine-readable medium of claim 16, wherein the device communicates the digital letter of credit to the merchant device to process payment for a transaction between the user and the merchant.

* * * * *